United States Patent

[11] 3,537,345

[72] Inventor Antonio Luppino
 Willard, Ohio
[21] Appl. No. 698,863
[22] Filed Jan. 18, 1968
[45] Patented Nov. 3, 1970
[73] Assignee PPG Industries, Inc.
 Pittsburgh, Pennsylvania
 a corporation of Pennsylvania

[54] GLASS CUTTING APPARATUS
 2 Claims, 9 Drawing Figs.

[52] U.S. Cl. ................................................. 83/12,
 33/27, 83/565, 144/144
[51] Int. Cl. .................................................. B26d 3/08
[50] Field of Search........................................ 83/6, 8, 12,
 565, 9, 10, 11; 144/144, 144.1; 33/27(K), 23(H)

[56] References Cited
 UNITED STATES PATENTS
 2,763,928 9/1956 Smith .............................. 33/27
 3,227,016 1/1966 Moeller .......................... 83/11

FOREIGN PATENTS
1,058,687 2/1967 Great Britain................ 83/565

*Primary Examiner*—Andrew R. Juhasz
*Assistant Examiner*—James F. Coan
*Attorney*—Chisholm and Spencer ABSTRACT: A device for scoring glass having a support table with a conveyor belt disposed upon the surface of the support table. A supporting frame is mounted over the conveyor belt, a rotatable eccentric arm assembly is mounted beneath the supporting frame and over the conveyor belt. An air-driven scoring tool is mounted on a sliding block which is movable upon the eccentric arm assembly, a guide tract or cutting die is mounted over the conveyor belt, the scoring tool is guided in the pattern desired by both guide wheels and a drive wheel which runs along the cutting die providing both guidance and motive power to the scoring tool.

Patented Nov. 3, 1970

INVENTOR
ANTONIO LUPPINO

ATTORNEYS

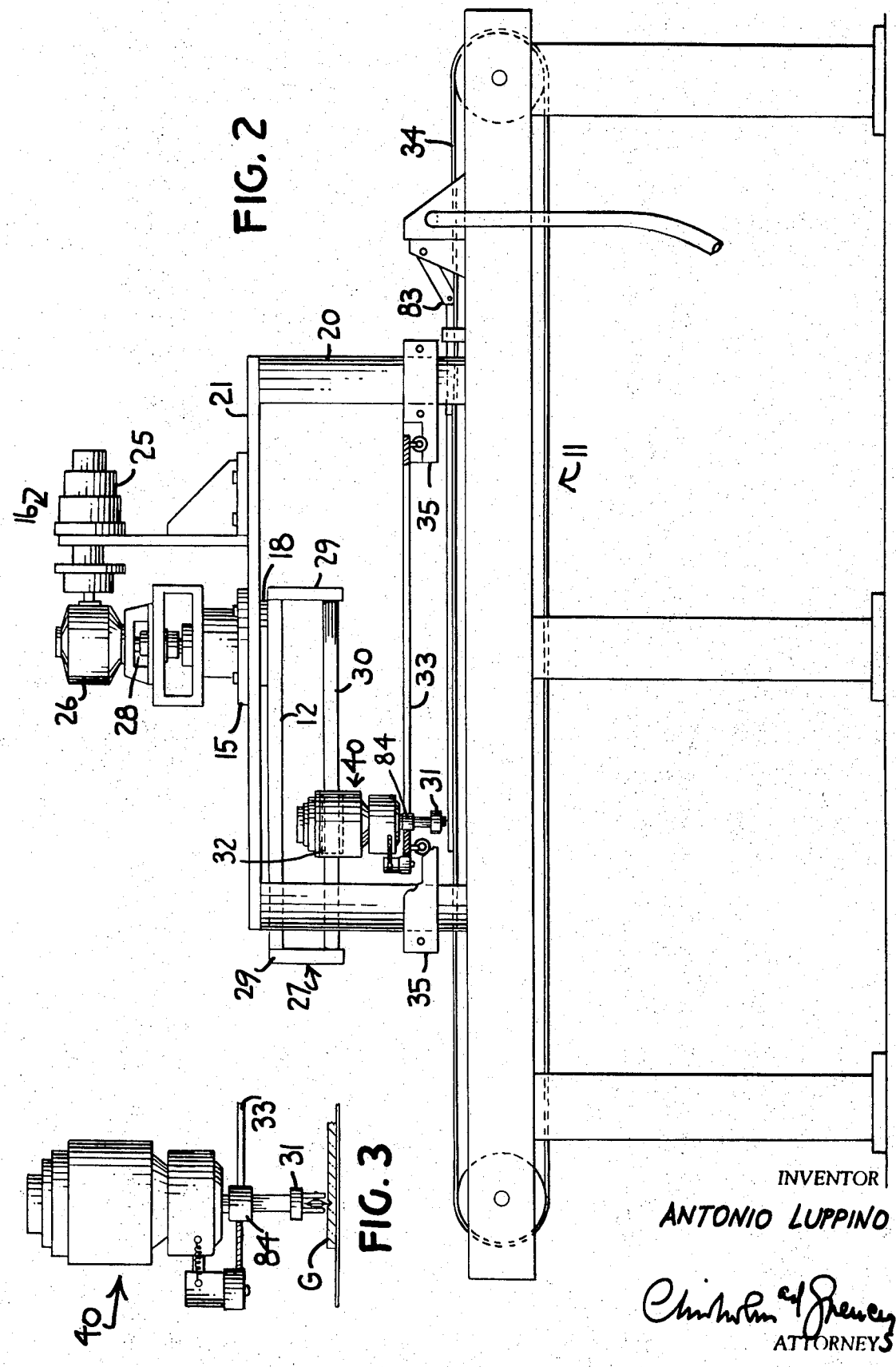

INVENTOR
ANTONIO LUPPINO
ATTORNEYS

INVENTOR
ANTONIO LUPPINO ns3,537,345

GLASS CUTTING APPARATUS

SPECIFICATION

The scoring of glass panels for automobile side lights has been performed by the mechanical scribing of the outline of the desired pattern onto the surface of the glass and, subsequently, snapping the glass along the scored lines. These patterns have been of a rectangular shape and of a relatively simple design. However, with the advent of changes in automobile styling, it has become necessary to produce more complicated patterns, including those having very tight corner designs—and by this is meant corners wherein the radius of the curve is from a center which is at a point outside the glass. Present scribing equipment does not function efficiently to produce such tight corner designs. When the scribing tool comes within the radius of such corners, it frequently gouges the surface of the glass at such a depth that the scoring device is broken and/or the glass is displaced from its position device and the resulting pattern is inaccurate and the side light is useless. The present invention is a cutting device which will produce glass patterns having a radius with a center which is outside the glass sheet itself. The apparatus provides means for both guiding the cutting and/or scoring tools along a desired pattern and also for providing motive power at the scoring head in contact with the glass which eliminates the problem of gouging when the scoring tool forms very tight curves as hereinabove defined.

The apparatus has a support table which provides a platform and a base for the remainder of the equipment. A conveyor belt travels over the top surface of the support table and is used to run the glass in from a supply point to a point beneath the scoring device wherein automatic equipment positions the glass automatically beneath the scoring tool. A supporting frame is mounted over the support table and over the conveyor belt. An eccentric arm assembly is pivotably mounted beneath the surface of the support frame, a motor-driven and drive shaft assembly mounted above the support frame and connected to the eccentric arm assembly by a shaft provides motive power for turning the eccentric arm assembly in all points in a plane. An air-driven scoring head is mounted on a slide block on the eccentric arm assembly. The tool is movable in all points in a plane within the radius of the eccentric arm assembly. The cutting guide or die is mounted over the support table and spaced away therefrom. A cam follower and a drive wheel mounted on the scoring head are in contact with the guide and the guide served to both position and also as a track for positive traction for the scoring tool. A turbine driven by air under pressure is used to power a set of sprockets which in turn are connected by a chain drive to the driving wheel which is in friction engagement with the track of the cutting die. The eccentric arm assembly consists of a pair of brackets connected by a pair of case rods for providing a both longitudinal and transverse path of travel relative to the support table for the sliding block and also the air-driven scoring tool. The scoring tool is thus free to move anywhere in a plane over a 360° angle as well as to pass over any point in the same plane which is formed by the glass sheet positioned within and on the supporting table of the cutting apparatus.

FIG. 2 is a side view of the air-driven scoring apparatus with certain covers removed;

FIG. 3 is a side view of the air-driven scoring head assembly of FIG. 1;

Figure 1:
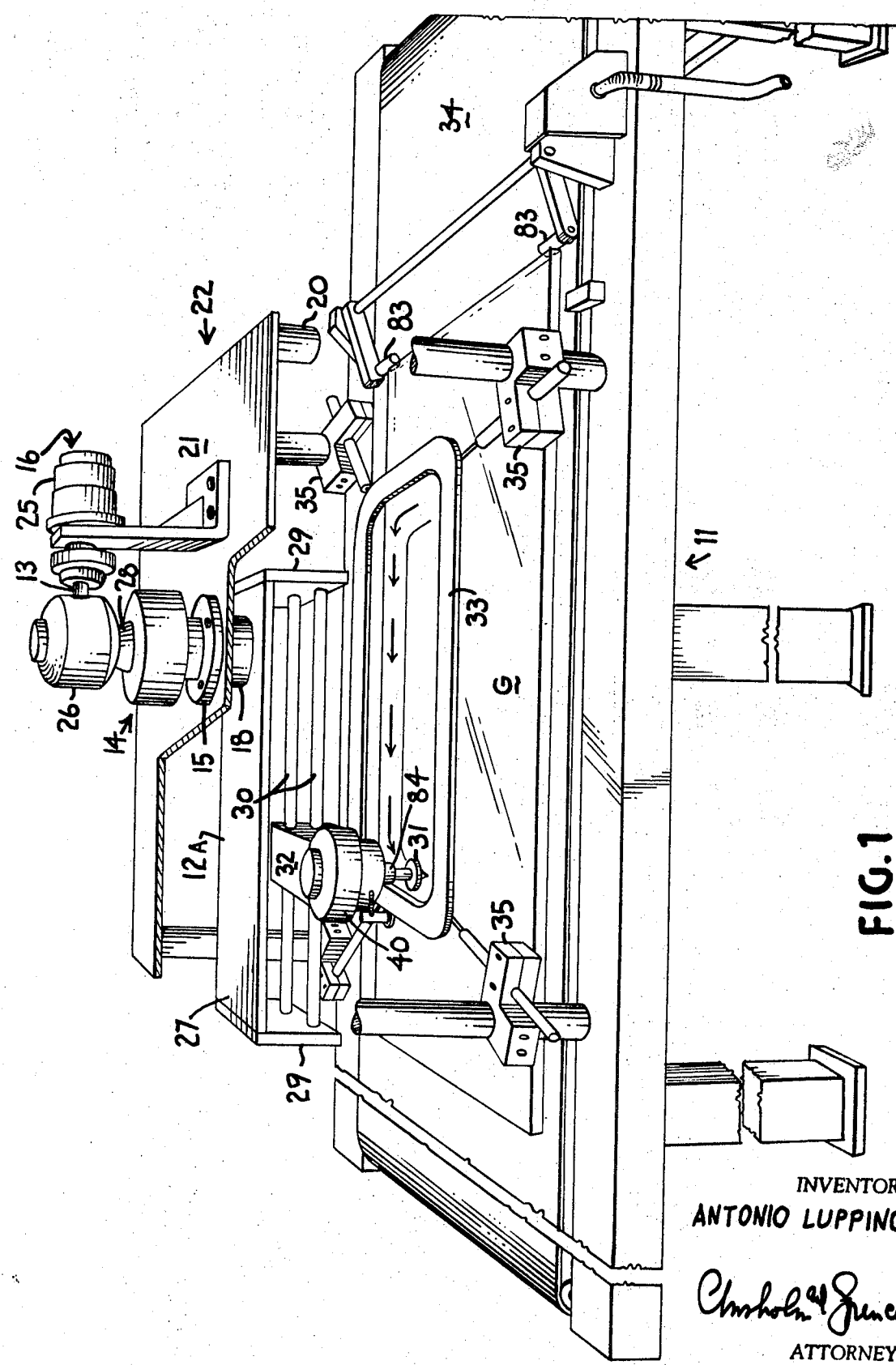
FIG. 1 is a perspective view of the air-driven scoring apparatus.

FIG. 1 is a perspective view of the cutting apparatus. A support table 11 is shown having a conveyor belt 34 moving over the surface thereof, a glass-stopping mechanism 83 is shown positioned over the conveyor belt 34. A support frame 22 is mounted on pillar posts 20 over the conveyor belt 34. The support frame is used as a base for a motor drive assembly 16 having a motor 25, a speed-reducing gear 26 attached to the motor shaft 13, a drive shaft assembly 14 connected between the reducing gear and piercing the base plate 21 of the support frame. An eccentric arm assembly 27 is pivotably mounted beneath the support frame base and is rotatable in a 360° plane. An air-driven scoring head 40 is mounted on a slide block which is movable longitudinally and axially along the eccentric arm assembly. An air-driven scoring head 31 extends downwardly and can be contacted to glass G positioned beneath the head. A cutting pattern or die 33 is positioned on pillar post 20 over conveyor 34 and the scoring head assembly 40 is contacted to the cutting die by means of a cam follower 84. A description of the components of the cutting apparatus follows:

SUPPORT TABLE

The support table 11 has a pair of legs at either end to support a stable base. A conveyor belt 34 is positioned atop the support table and runs in an endless manner to transport glass from a suitable supply point beneath the scoring device. A set of stops 83 which may be either air or mechanically actuated are lowered and the glass abuts the stop 83 and is then positioned beneath the scoring device. A suitable cut-off mechanism is actuated by the contact between the glass and the stop device. A support frame structure 22 is mounted atop the support table. A base plate 21 is supported by pillar posts 20. The supporting frame needs to be strong enough to hold the associated drive equipment and eccentric arm assembly as well as the air-driven scoring tool. A cutting pattern or die 33 is positioned above the belt 34 by pillar posts assembly 35 which extends over the conveyor and provides a clearance for the glass sheet to move beneath the cutting die and the scoring tool. The arrangement of the cutting die in relationship to the support table is shown clearly in FIG. 1.

SUPPORTING FRAME

The support frame has a base plate 21 which is supported in spaced relation above the cutting die and conveyor belt by pillars 20. A single sheet of steel or iron makes a suitable support base. The pillars also provide a mounting for the cutting die pillar posts assembly 35.

MOTOR DRIVE AND DRIVE SHAFT ASSEMBLY

Power for turning the eccentric arm assembly 27 is provided by a motor drive assembly 16 and shaft arrangement 14. A motor 25 is mounted on the base plate by any suitable mounting. A speed-reducing gear 26 is positioned on a shaft 28 and connected to the motor 25. The shaft and speed reducer are mounted on a housing 15 which is bolted or welded to the base plate 21.

FIG. 2 is a side view showing the support table, supporting frame, the motor power, the drive shaft, and the eccentric arm assembly in the side view. FIG. 3 is an enlarged view of the air-operated scoring head showing the details of the engagement between the scoring head and the cutting die.

ECCENTRIC ARM ASSEMBLY

Figure 9:
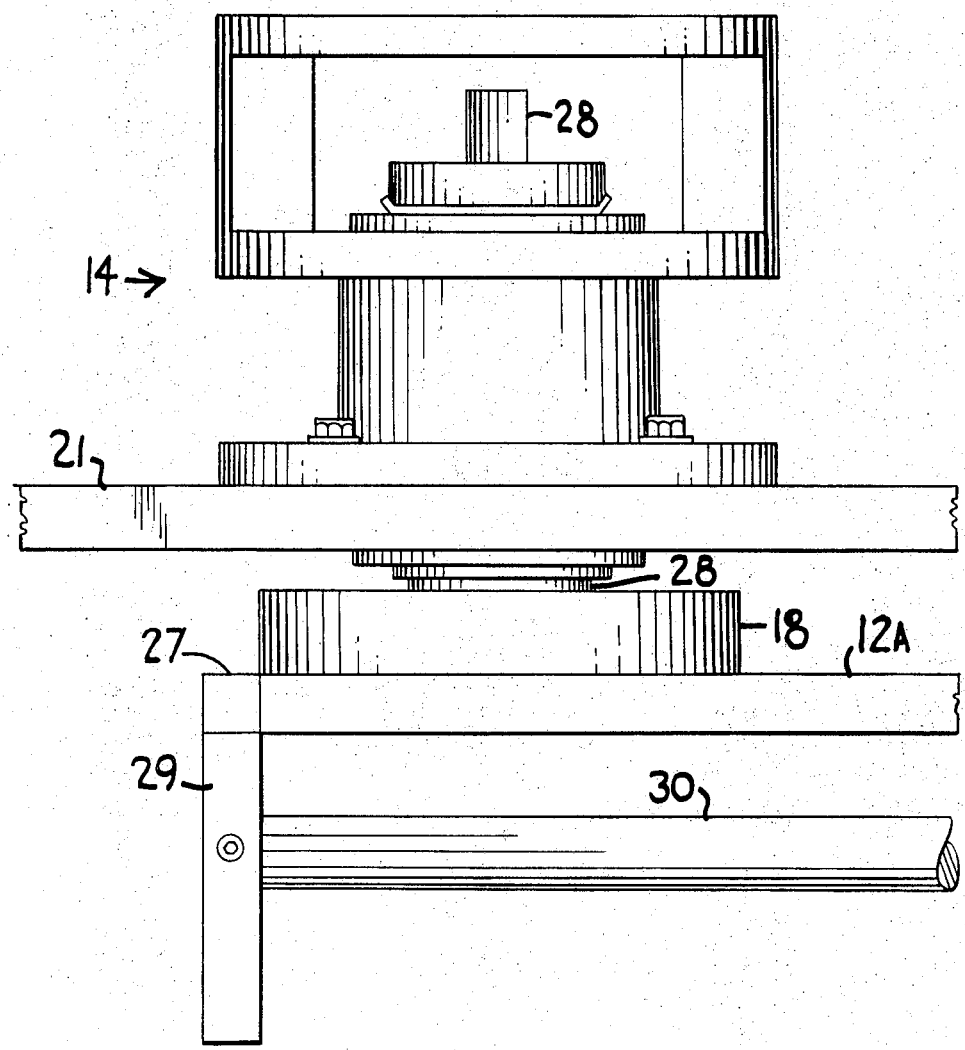
FIG. 9 is an enlarged view of the connection between the motor drive assembly and the eccentric arm assembly.

The eccentric arm assembly 27 can be seen in perspective in FIG. 1 and side view in FIG. 2 and in detail in FIG. 9. A drive shaft block 18 is mounted beneath the base plate of the supporting frame. A shaft 28 connects the reduction gear to the drive shaft block 18 in order to provide motive power to turn the eccentric arm assembly. A supporting bar 12 is connected to the drive shaft block. A pair of end brackets 29 form a support for a pair of parallel, horizontally disposed case rods 30 which are connected at either end to the brackets. A slide block 32, FIG. 1 and FIG. 2, having a pair of sleeves through which are inserted the parallel case rods is mounted horizontally on the case rods 30. The block is movable along the axis of the rods. The eccentric arm assembly 27 is mounted so as to pivot about the long axis of the shaft 28 and is offset from the center of the base plate 21. The offset pivoting and the ability of the sliding block to move along the axis of the rods permits the slide block to be in a position above the conveyor belt at any point in a plane which is the glass disposed beneath the air scoring tool.

THE AIR-DRIVEN SCORING HEAD AND TOOL

Figure 6:
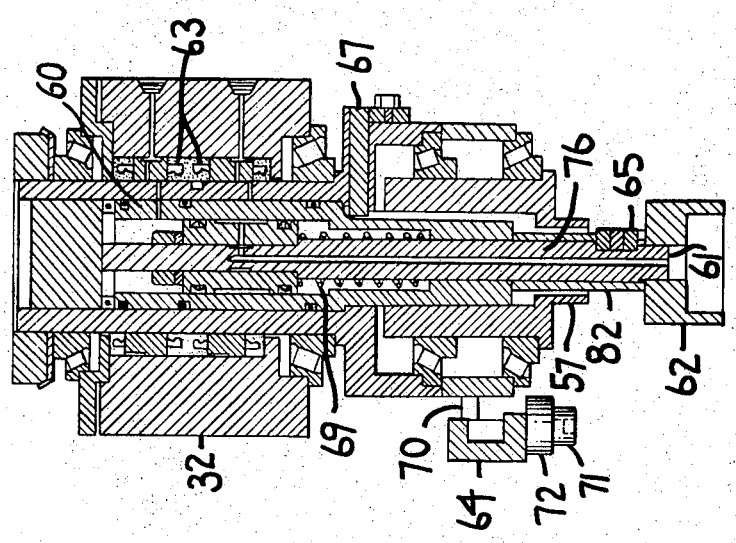
FIG. 6 is a cross section of the air-driven scoring assembly of FIG. 5.
Figure 5:
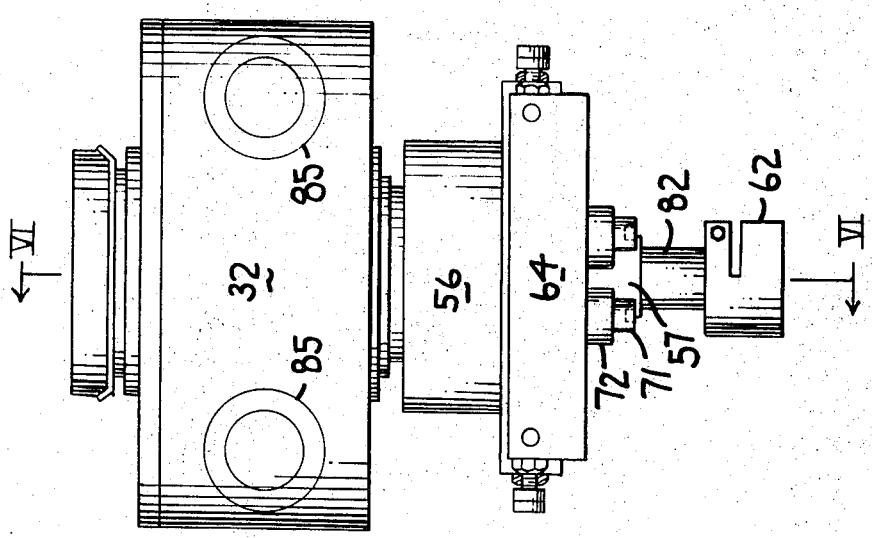
FIG. 5 is an end view of the scoring assembly of FIG. 4.
Figure 4:
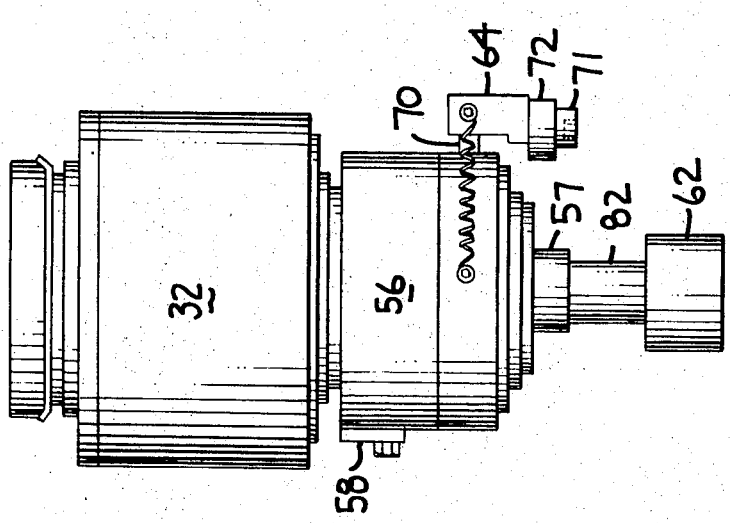
FIG. 4 is another view of the air-driven scoring head assembly of FIG. 3.
Figure 8:
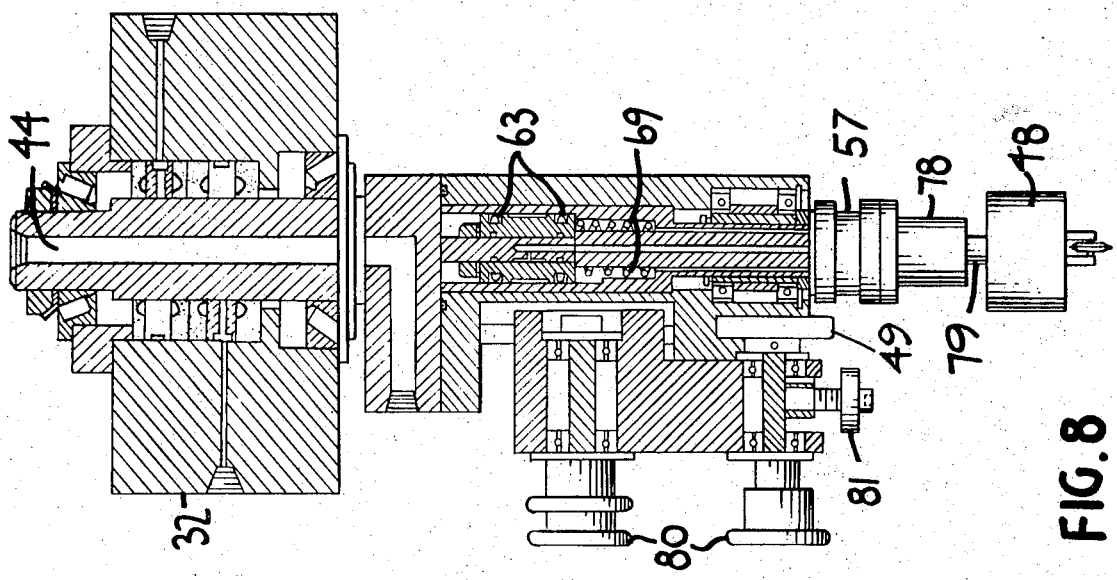
FIG. 8 is a cross section of the assembly of FIG. 7.
Figure 7:
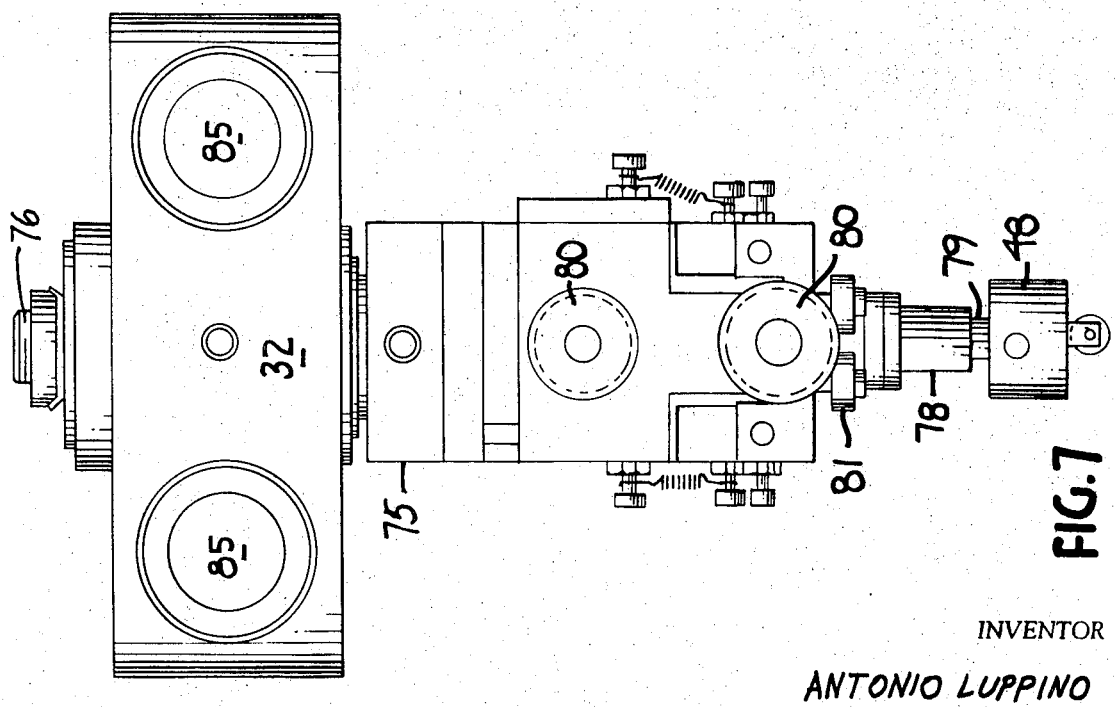
FIG. 7 is a side view of another air-driven scoring head assembly.

An air-driven scoring head assembly 40 is attached to the slide block. Typical assemblies are described in FIGS. 4, 5, 6, 7, and 8. A central shaft having a conduit for supplying air is positioned in the same axis as the drive shaft. FIG. 4 shows a typical scoring head. A size control roller 57 and a cap screw and cone arrangement 71 and 72 provide an adjustable means for engaging the scoring device cam follower 82 with the guide track or the cutting die 33. The air-driven scoring device may be of several designs, one of which is illustrated in FIGS. 4, 5, and 6, and a second is illustrated in FIGS. 7 and 8. FIG. 1 illustrates a device which is mounted at the side of a sliding block. FIGS. 4, 5, 6, 7 and 8 illustrate air-driven scoring tools which are mounted directly in line with the drive shaft of the scoring device below the slide block. FIG. 4 shows a detailed side view of an air-driven scoring head. A slide block 32 provides a mounting for an air-driven turbine. The central shaft has a tool post holder 62 positioned at the end thereof for holding a scoring device for actually scoring the glass.

FIG. 5 shows an end view of the slide block 32 of FIG. 4. The cutting head assembly shown in FIG. 5 has a slide block 32 and sleeves 85. The supporting case rods 30 pass through the sleeves 85. The swivel block 58 on sleeve bearing 56 provides a means for the cutting head to turn on the mounting as it goes around the track 33. The key 65 is a positioning device for easily changing the scoring tool in the cutter head assembly. The clevis 67 is also a positioning device for anchoring the various parts of the cutter assembly in one immovable piece. The piston 78 and piston rod 79 provide means for exerting pressure on the scoring device attached to the ends of the cutter assembly. The bearing 81 rides on the track 33 to guide the cutter assembly around the track. The sleeve 85 has been described above.

FIG. 6 is a section view of FIG. 5 showing the air-operated scoring device. In FIG. 6 a cylinder 60 is mounted vertically within the slide block. A piston rod 61 is within the cylinder and provides a mounting for the tool post holder. In FIG. 8 the piston is designated as numeral 78 and the piston rod is 79. In FIG. 6 a spring 69 is inserted between the piston and the cylinder. This permits the movement of the scoring tool axially up and down relative to the glass G. The tool post holder is actuated by air and placed in contact with the glass. Several spacers 63 are utilized to make minor adjustments in height. Case rods 70 are used to mount the base 64, which support the capscrew and cone mechanism, which is used to contact the guide track.

FIG. 7 is an end view of another embodiment of an air-operated or air-driven scoring assembly. FIG. 8 is a cross section of the assembly of FIG. 7. A shaft 76 provides a mounting for the cutter block 75. Sprockets 80 are connected by a chain drive and provide motive power for a drive wheel 49 which is in friction engagement with the top of the cutting track. FIG. 8 shows a cylinder and piston with a spring mounting 69 which permits an up and down motion of the tool post holder 48. Air passed through a central conduit 44 is used to operate the sprocket, which in turn drives the traction wheel and the traction wheel moves the tool post over the glass in a desired pattern. The scoring tool is mounted, as described, on an eccentric arm assembly and is raised and lowered by means of an air-actuated cylinder. The eccentric arm assembly is powered by the motor, which is connected to a speed reducer, which in turn powers the central shaft piercing the base plate. A cutting die is mounted above the glass on a series of supporting arms which permits the raising and lowering of the cutting die.

OPERATIONS

In operation a piece of glass is placed on the conveyor belt and run in on the belt until the glass contacts the stops 83. By means of an electrically contact-actuated switch the air-driven scoring head is lowered onto the glass and a scoring device is actuated. Power is transmitted to the central shaft, and either by means of a cam follower or a positive traction of the driving wheel, causing the scoring device to move around and over the glass in the direction indicated by the arrows in FIG. 1. When the scoring pattern is completed the scoring tool is automatically inactuated by a contact switch and the scoring head is raised from the glass. At the same time the conveyor belt moves the glass forward and from beneath the scoring head. In a subsequent operation the scored pattern is broken out from the colored glass. This apparatus permits a wide range of patterns to be scored automatically, which have tight turns, without binding and without any great loss due to defective scores. Other embodiments of the air-driven scoring device are contemplated. The eccentric arm assembly mounting in conjunction with the slide block and the guide path provide a rigid, accurate means for scoring a pattern in a piece of glass including where the pattern requires very tight turns.

I claim:
1. An eccentric arm assembly for glass-scoring apparatus mounted on a base plate of a support assembly comprising:
   a. a central shaft mounted vertically through the plate;
   b. a supporting plate mounted horizontally on the lower end of said shaft;
   c. a pair of end brackets mounted on each end of the support plate;
   d. a pair of rods mounted between the end brackets and below the support plate;
   e. a slide block movably mounted on the rods; and
   f. means for turning said shaft thereby turning the eccentric arm assembly.

2. A device for scoring glass sheets in a preselected pattern having a glass support table, a patterned cutting die mounted on said support table, and a support frame disposed over said table comprising:
   a. an eccentric arm mounted to said support frame, said eccentric arm comprising:
      a horizontal support plate rotatably mounted to the support frame;
      an end bracket mounted at each end of the support plate;
      a pair of rods mounted between the end brackets; and
      a slide block movably mounted on the rods;
   b. means for turning said eccentric arm.